Oct. 27, 1931.  J. VAN BUREN  1,828,793
APPARATUS FOR FEEDING AND CUTTING MATERIAL
Original Filed April 9, 1928   3 Sheets-Sheet 2
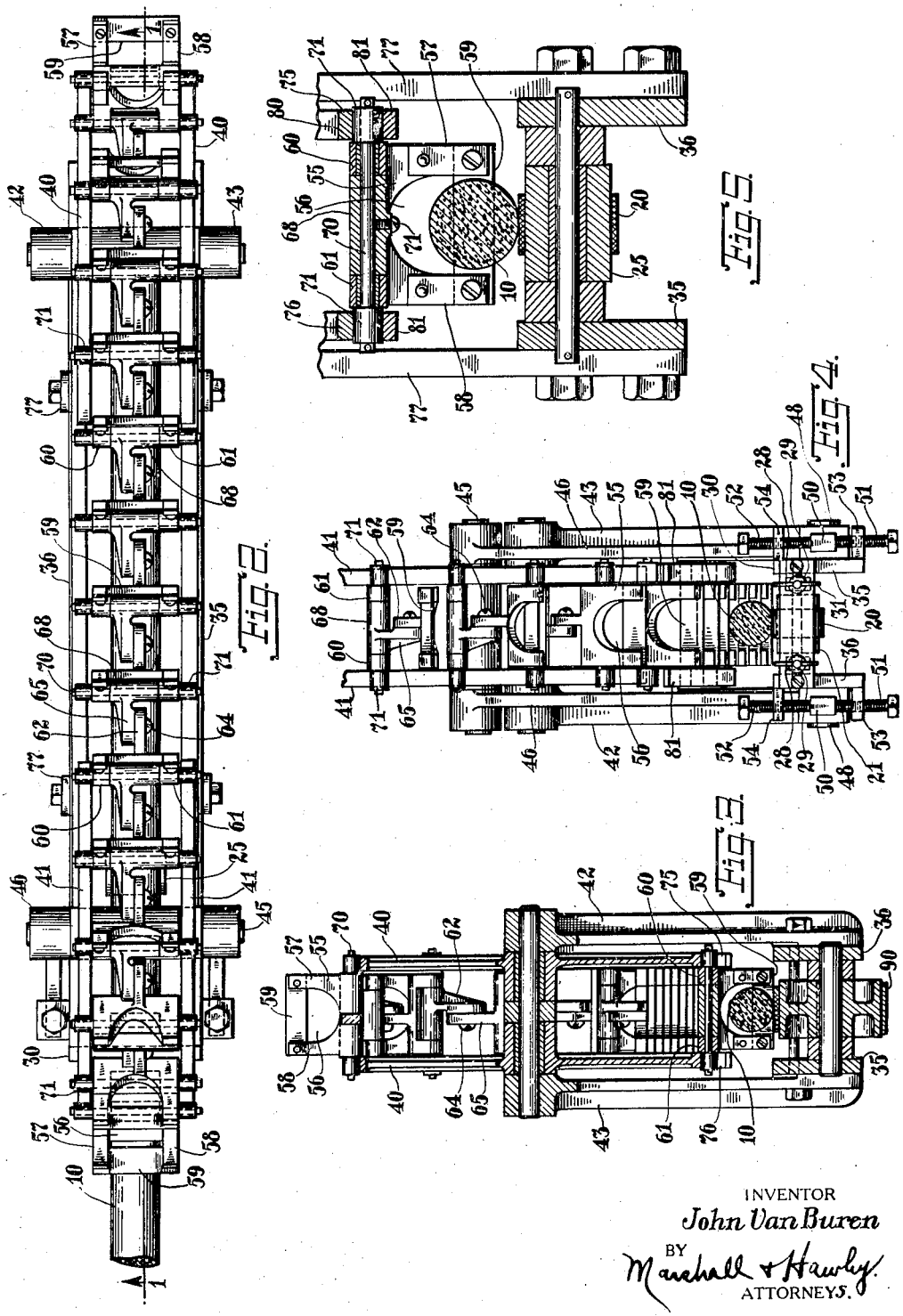
INVENTOR
John Van Buren
BY
Marshall & Hawley
ATTORNEYS.

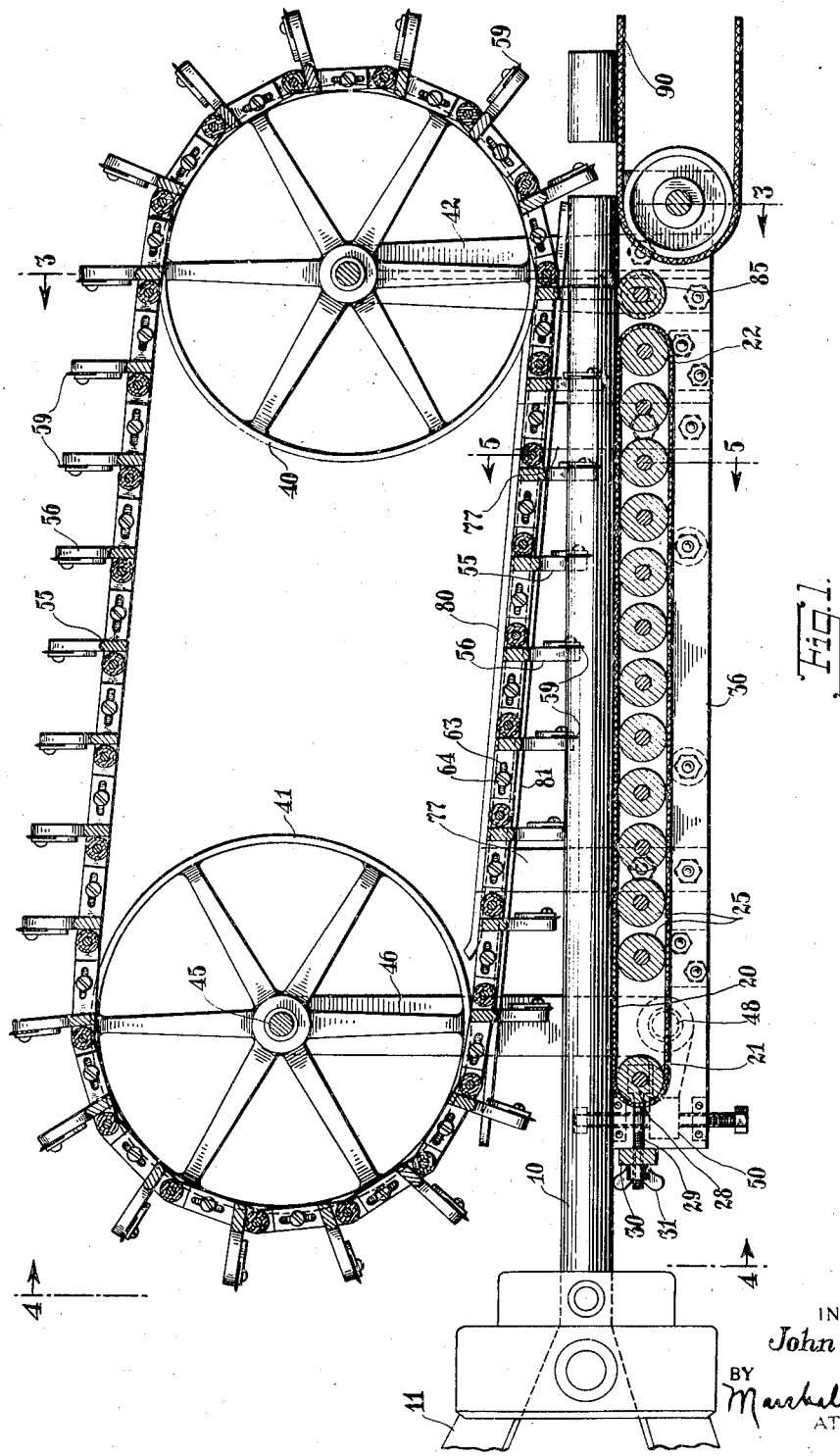

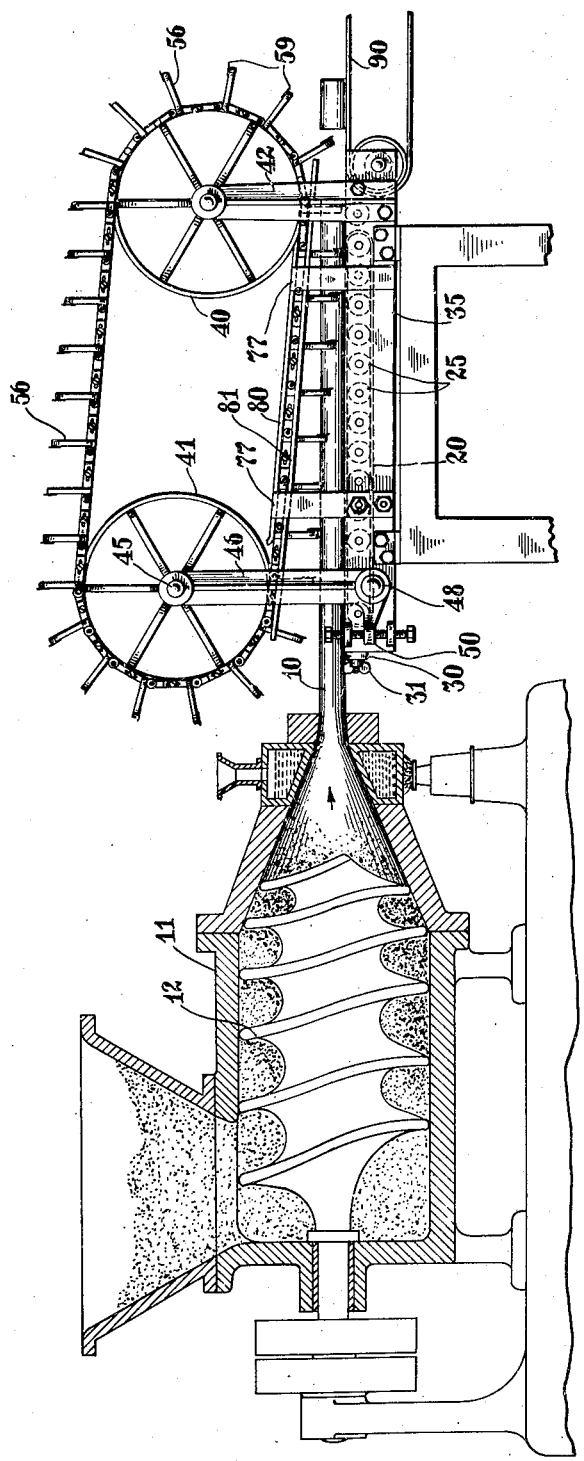

Patented Oct. 27, 1931

1,828,793

UNITED STATES PATENT OFFICE

JOHN VAN BUREN, OF BROOKLYN, NEW YORK

APPARATUS FOR FEEDING AND CUTTING MATERIAL

Application filed April 9, 1928, Serial No. 268,724. Renewed September 1, 1931.

This invention relates to a machine for cutting a continuously moving body of material, such for instance as soap, and, furthermore, to a method of feeding and cutting such material.

Although the invention has been particularly worked out for use in the manufacture of soap and will be described with reference to soap manufacture, it should be understood that it is applicable for use in cutting other material.

In the manufacture of certain types of soap it is common practice to cut off predetermined lengths of a body of soap as the material comes from the body forming machine known in the art as a plodder. These lengths are transferred to a cutter by which the material is cut into the proper lengths to form the cakes or bars of soap. This method of operation necessitates a considerable handling of the material, thus adding to the labor cost and, furthermore, the cutting up of the lengths of soap body in this manner usually results in considerable waste since the end pieces are irregular in length and are often not of sufficient length to permit their use for cakes and bars.

This invention has for its salient object to cut down the amount of handling and the labor cost in the manufacture of soap cakes or bars or in the feeding and cutting of like material.

Another object of the invention is to provide a continuously operable cutter adapted to coact with and cut a continuously fed body of material into the desired uniform lengths without waste.

Another object of the invention is to provide a machine of the character described, so constructed and arranged that the cutting elements will be fed entirely by the material cut.

Another object of the invention is to provide a practical and efficient method for feeding and cutting a continuously moving body of material in such a manner that the material will be uniformly cut regardless of the rate of feed thereof.

Further objects of the invention will appear from the following specification taken in connection with the drawings, which form a part of this application, and in which Fig. 1 is an elevational view of apparatus constructed in accordance with the invention, this view being taken substantially on line 1—1 of Fig. 2, looking in the direction of the arrows;

Fig. 2 is a top plan view of the construction shown in Fig. 1;

Fig. 3 is a sectional elevation taken substantially on line 3—3 of Fig. 1, looking in the direction of the arrows;

Fig. 4 is an end elevation taken substantially on line 4—4 of Fig. 1, looking in the direction of the arrows;

Fig. 5 is a sectional elevation taken substantially on line 5—5 of Fig. 1, looking in the direction of the arrows; and Fig. 6 is a sectional elevation of the cutter and the machine which feeds the elongated body of material to the cutter.

The invention briefly described consists of an apparatus for cutting a continuously moving body of material into uniform lengths in such a manner that the cutting elements will be fed entirely by the continuously moving body and will be so guided that they will be moved into cutting relation with the material and will cut the material into uniform lengths. The apparatus illustrated comprises means for continuously feeding a body of material, means for supporting the body as it is fed, and means for guiding a plurality of freely movable spaced cutting elements into cutting relation with the body, the cutting elements being fed entirely by the movement of the continuously moving body of the material.

Further details of the invention will appear from the following description.

In the particular form of the invention illustrated, a body 10 of soap, which may be cylindrical as shown or if desired may be rectangular or any other shape, is fed out of a machine 11 by means of any suitable feeding mechanism, such as a screw 12. This material is squeezed out through a suitable nozzle or through suitable dies in the form of a continuous body.

The cutting mechanism illustrated comprises an endless belt 20 mounted on rollers 21 and 22 which are freely movable, the roller 21 being shown as adjustable toward and from the roller 22. The belt 20 is also supported on freely movable rollers 25.

The roller 21 is carried by bearing blocks 28 which are in turn carried by screws or threaded rods 29 adjustably mounted in a bar 30. Thumb nuts 31 are mounted on the threaded outer ends of the screws or rods 29.

The bar 30 is carried by and is connected at its ends to side frame members 35 and 36 between which the rollers are mounted and by which the rollers 22 and 25 are supported. The belt 20 is supported at such an elevation that it will be disposed substantially on a level with the under surface of the body of material fed from the machine 12.

The cutting mechanism is supported on a pair of freely rotatable wheels or pulleys 40 and 41. The pulley 40 is mounted in upright supporting arms or brackets 42 and 43 secured to the side frames 35 and 36. The pulley 41 is carried by a spindle or shaft 45 which is mounted at the upper ends of arms 46 which form portions of a pair of bell crank levers pivoted at 48 to the side frames 35 and 36. The other ends 50 of the bell crank levers are mounted between set screws 51 and 52 carried by lugs 53 and 54 extending laterally from the side frames 35 and 36. By adjusting the set screws 51 and 52 the bell crank levers can be swung on their pivots to move the arms 46 toward and away from the upright supporting brackets 42 and 43.

An endless carrier made up of a plurality of cutting elements is mounted on the wheels or pulleys 40 and 41. Each cutting element comprises a plate 55 having a recess 56 forming bifurcations 57 and 58, to the ends of which is secured a blade or knife 59. Each of the plates 55 has laterally extending therefrom a pair of pivot lugs 60 and 61 and has laterally extending therefrom in an opposite direction, a lug 62. Each of the lugs 62 is provided with a slot 63 which receives a screw 64 for securing the lug 62 to a lug 65 extending laterally from a sleeve 68.

Each of the sleeves 68 is interposed between a pair of lugs 60 and 61 and a pin 70 is secured in the sleeve by a set screw 71 and extends through the lugs 60 and 61 and has mounted on each end thereof a roller 71.

The cutting elements are adjustable toward and away from each other to vary the spacing thereof by means of the screw 64 and when the spacing between the cutting elements is changed the bell crank levers 46 must be tilted in one direction or the other to properly space the pulleys 40 and 41.

In order to guide the cutting elements into cutting relation with the body of material to be cut, guideways 75 and 76 are supported by brackets 77 and receive the rollers 71 carried by the ends of the pins 70. Each guideway consists of an upper rail 80 and a lower rail 81, the lower rail being extended beyond the upper rail, as shown in Fig. 1. It will be noted that the guide rails are inclined with respect to the path of movement of the body of material, thus gradually guiding the cutting elements into the body of material.

Furthermore, it should be noted that the cutting elements are freely movable around the pulleys 40 and 41 and are not positively actuated, their movement being caused solely by the engagement of the cutting elements with the moving body of material. Thus any change in the rate of movement of the body of material will automatically change the rate of movement of the cutting elements and the cutting elements will cut the body of material into uniform lengths regardless of the rate of movement of the material.

From the showing in Fig. 1 it will be noted that a roller 85 is mounted between the side plates 35 and 36 of the material supporting frame in advance of the belt 20 and the guideways 75 and 76 are so inclined that the material is completely severed or cut as it passes over the roller 85. The severed lengths of material then pass onto a conveyor 90 which is driven at a faster rate of speed than the rate of movement of the material. The conveyor therefore carries the severed lengths away from the cutting mechanism.

From the foregoing description it will be seen that a simple and practical method and apparatus for severing a continuously moving body of material has been designed and that the material will be cut thereby into uniform lengths, without requiring any handling or resulting in any waste material.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. In combination, means for continuously feeding a body of material, guiding means for said material, an endless carrier comprising a plurality of spaced cutting elements, means to vary the spacing of said elements on said carrier means for guiding said elements successively into cutting relation to said body of material, said carrier and elements being fed by the material.

2. In combination, means for continuously feeding a body of material, guiding means for said material, an endless carrier comprising a plurality of spaced cutting elements, means to vary the spacing of said elements on said carrier, supports for said carrier, and means to adjust said supports toward and from each other, means for guiding said elements successively into cutting relation to said body of material, said carrier and elements being fed by the material.

3. In combination, means for continuously feeding a body of material, guiding means for said material, an endless carrier comprising a plurality of spaced cutting elements, means to vary the length of said carrier, and means for guiding said elements successively into cutting relation to said body of material, said carrier and elements being fed by the material.

4. In combination, means for forming and continuously feeding a body of material, a conveyor for said material, a plurality of spaced cutting elements, and a backing roll spaced from said conveyor and adapted to cooperate with said elements as the cut is completed, and means for guiding said elements into and through said body of material.

5. In combination, means for forming and continuously feeding a body of material, an endless conveyor belt having a horizontal surface for carrying the moving material, an endless cutter belt above the conveyor belt provided with spaced knives projecting laterally therefrom, the lower lap of said cutter belt being inclined downwardly toward the carrying surface of the conveyor belt and extending beyond the same, and a roller in advance of the conveyor belt arranged to contact with said knives.

6. In combination, means for forming and continuously feeding a body of material, a pair of endless conveyor belts having surfaces for carrying the moving material, the first of said conveyor belts moving at the rate of the moving material, an endless cutter belt above the first conveyor belt provided with spaced knives projecting laterally therefrom, the lower lap of said cutter belt being inclined downwardly toward the carrying surface of said first conveyor belt and extending beyond the same, and a roller interposed between the two conveyor belts arranged to contact with said knives.

7. In combination, means for forming and continuously feeding a body of material, a pair of endless conveyor belts having surfaces for carrying the moving material, the first of said conveyor belts moving at the rate of the moving material, an endless cutter belt above the first conveyor belt provided with spaced knives projecting laterally therefrom, the lower lap of said cutter belt being inclined downwardly toward the carrying surface of said first conveyor belt and extending beyond the same, and a roller interposed between the two conveyor belts arranged to contact with said knives, said second conveyor belt being driven at a higher rate of speed than that of the first conveyor belt.

In witness whereof, I have hereunto set my hand this 6th day of April, 1928.

JOHN VAN BUREN.